United States Patent

Kraetschmer et al.

[11] Patent Number: 5,466,542
[45] Date of Patent: Nov. 14, 1995

[54] A MAGNETIC RECORDING MEDIUM

[75] Inventors: Reinhard Kraetschmer, Landsberg; Albert Pertzsch; Josef Schelble, both of Munich, Germany

[73] Assignee: BASF Magnetics GmbH, Mannheim, Germany

[21] Appl. No.: 170,728

[22] Filed: Dec. 21, 1993

[30] Foreign Application Priority Data

Dec. 23, 1992 [DE] Germany .......................... 42 43 846.2

[51] Int. Cl.$^6$ .................................................. H01F 10/02
[52] U.S. Cl. ................................. 428/694 BS; 427/122; 427/123; 427/131; 427/132; 427/404; 427/412.1; 427/434.2; 428/694 BM
[58] Field of Search .................................. 427/128–132, 427/122, 123, 404, 434.2, 412.1; 428/900, 694 BS, 694 BM

[56] References Cited

U.S. PATENT DOCUMENTS 5,318,828  6/1994  Noguchi et al. ................... 427/131 X

*Primary Examiner*—Bernard Pianalto
*Attorney, Agent, or Firm*—Keil & Weinkauf

[57] ABSTRACT

A wet-on-wet application process by means of a sheet extruder having at least two slot dies is described, the upper layer containing metal powders and/or metal powder alloys while the lower layer contains the same magnetic pigments and conductivity-increasing and/or transparency-reducing additives, preferably carbon black, and both layers having virtually the same rheological properties. The magnetic recording medium has improved conductivity and very good running behavior, in particular when used as a mirror mastertape.

2 Claims, 1 Drawing Sheet

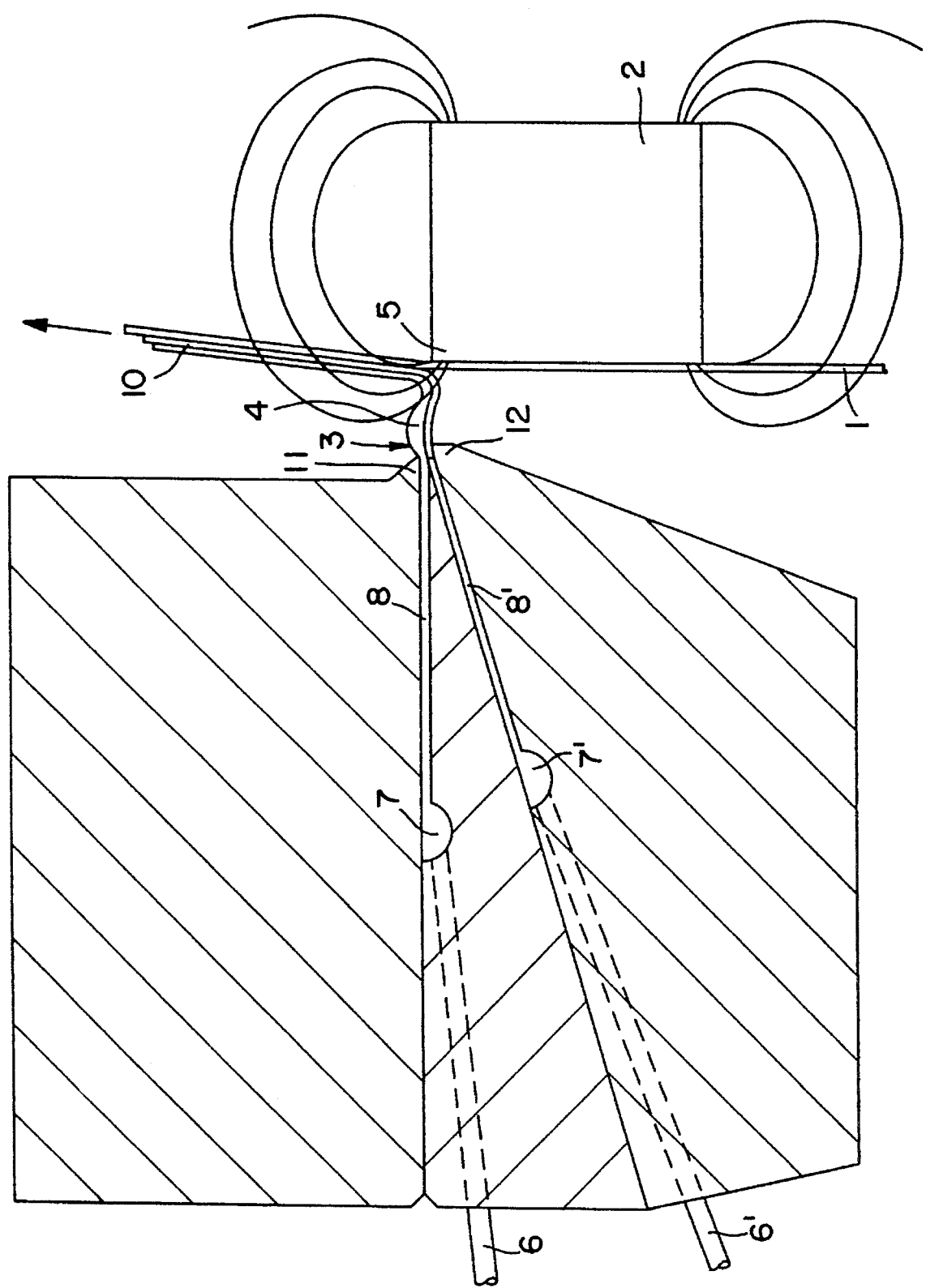

A MAGNETIC RECORDING MEDIUM

The present invention relates to a process for the production of a magnetic recording medium by means of a sheet extruder having at least two slot dies for the wet-on-wet application of a plurality of magnetisable layers one on top of the other, the upper lip of the common outlet orifice of the slot dies being recessed relative to the lower lip and a cuboid magnet whose upper edge is opposite the extruder orifice being arranged behind the substrate and parallel thereto.

It is known that the electrical conductivity of magnetic tapes is very important for many applications. The intensive friction between the magnetic tape surfaces and the contact elements during operation gives rise to charges which, when the insulator property of the tape is too good, cannot be conducted away sufficiently rapidly and may interfere with the recording and playback process as a result of irregular discharge phenomena. On the other hand, for example in the case of a conductive backing coating, if there is too great a difference relative to the conductivity of the magnetic layer (roughly greater than or equal to $10^6$ $\Omega\square$), the result is a capacitor effect due to charging of the magnetic layer/film interface, which results in the tape having a considerable tendency to adhere to the contact elements and thus may considerably impair the running behavior of the tape in a recorder.

The conductivity of a magnetic layer can be brought to the desired range (as a rule less than or equal to $10^9$ $\Omega/\square$) by adding carbon black as a component of the layer. Here, however, concentrations of from 5 to 10% of carbon black (based on pigment) must be added in order to achieve sufficient conductivity. This means a dilution of the effective ferromagnetic material and hence a reduction in the storage quality.

European Patent 0,392,810 discloses a magnetic recording medium which is applied as a double layer by the wet-on-wet process and whose upper magnetic layer contains carbon black particles having a size of 40–500 µm, the magnetizable particles being cobalt-doped iron oxide and at least one of the layers containing a binder having polar groups.

German Patent 3,904,068 describes a magnetic recording medium which has a double-layer structure and whose magnetizable particles are likewise γ-iron oxide and which contains, in both part layers, carbon black having different particle diameters.

European Patent 0,373,856 describes a magnetic recording medium which has a similar composition, is applied by the wet-on-wet process and has a backing coating on the other side of the substrate. Moreover, U.S. Pat. No. 4,946,740 discloses a magnetic recording medium which has a double-layer structure and whose magnetizable particles likewise consist of iron oxide and which contains, in both part layers, carbon black having different particle sizes.

Magnetic recording media of the more recent generation contain, as magnetizable particles, metal powders or metal powder alloys which must have a specific layer conductivity which has already been frequently described in the system specifications, since otherwise the function of the recording medium suffers with regard to the mechanical parameters in cooperation with the tape drives. Furthermore, the magnetic recording media must contain additives, such as lubricants and hardening agents, for adjusting the running behavior and for minimizing the abrasion.

It is an object of the present invention to provide a process for the production of a magnetic recording medium, in which the recording medium contains, as magnetizable particles, predominantly metal powders or metal powder alloys, suffers no impairment of the storage quality and can be produced in one operation, and where the layer additives are distributed so that the magnetic recording medium has optimum mechanical parameters and performance characteristics, in particular sufficient conductivity and/or opacity.

We have found that this object is achieved, according to the invention, by a process according to the preamble of claim 1, two magnetizable layers having very similar rheological properties being applied by the wet-on-wet process and, in both magnetizable layers, the additives for adjusting the required parameters being distributed so that the magnetic recording medium has an optimum storage quality.

The sheet extruder arrangement for the wet-on-wet application according to the novel process is described in detail in the WO-Application 93/02017, so that this need not be discussed further here. The novel process is described in detail with reference to the example given below, without restricting the invention thereto.

BRIEF DESCRIPTION OF THE DRAWING

The drawing shows an extrusion coater, as described in the cited application PCT/EP 93/02017, showing: the substrate (1) onto which the extruded layers are deposited; a coating magnet (2) past whose polarized surface the substrate travels; the outlet orifice (3), aimed more or less perpendicular to the substrate (1) and opposite the upper corner (5) of the magnet; supply channels (6, 6'), supplying the magnetizable, magnetic pigment-containing upper layer and the nonmagnetizable lower layer materials, respectively; distribution chambers (7, 7'), which spread out the materials to the extrusion slots (8, 8'); the common outlet orifice (3), the upper lip (11) of which is recessed relative to its lower lip (12); and the magnetic dispersion (10), deposited on the substrate (1).

There are in principle no restrictions with regard to the composition of the two layers containing the magnetic pigments. The magnetizable pigments are mainly finely divided metal powders or metal alloys which have a high coercive force and whose BET value is preferably greater than 35 m$^2$/g. As a result of their preparation, these pigments are generally covered with a protective coating to minimize corrosion. This measure reduces the conductivity of the pigments and thus leads to the requirement for adjusting the layer conductivity by means of corresponding additives, which are described further below. However, other magnetizable pigments, such as doped and undoped iron oxides, iron carbide or $CrO_2$, may also be admixed.

The conventional polymeric binders, such as polyesters, polyesterurethanes, polyurethane, vinylidene chloride/acrylonitrile copolymers, vinyl chloride/vinyl acetate copolymers, polycarbonatepolyurethane or others, may be present as binders for dispersing the magnetizable particles. Particular advantages for the homogeneous fine distribution of the magnetizable pigments may also be obtained if dispersant compounds, as described, for example, in German Patent 4,034,747, are mixed with the binders.

The layers may furthermore contain nonmagnetic fillers, such as $\alpha\text{-}Fe_2O_3$, $Al_2O_3$, $TiO_2$, $SiO_2$ and other conventional pigments or dulling agents. Examples of these are given in U.S. Pat. No. 4,863,793.

Other additives which may be used are the conventional lubricants, such as fatty esters or silicone compounds, and hardening agents and hardening catalysts.

Conductivity carbon blacks, pigment carbon blacks, hydroquinone and the like, as well as mixtures of these substances, may be used to increase the conductivity and/or reduce the light transmittance. Since the upper layer is preferably applied without carbon black, the magnetic recording medium produced by the novel process has a high packing density and accordingly good storage values, and, owing to the specific rheological conditions, there is no danger of intermixing of the two layers during wet-on-wet application. The amount of carbon black added is preferably 5–10% by weight, based on the magnetic pigment.

Since the ratio of the applicators of the two magnetizable layers can be adjusted by means of the novel process, it can be chosen so that the required optimum properties of the magnetic recording medium are obtained.

Furthermore, efficient production of the magnetic dispersion is possible by a method in which, since the compositions of the two part layers are essentially identical, it is possible initially to produce a single dispersion, which is then finally divided and the different additives, for example carbon black or abrasives, are then mixed with the two parts, in each part layer.

This is shown in the Example below, without however restricting the invention thereto. Preferably, the two part layers have very similar rheological properties, which are achieved by carefully adjusting the viscosity and the surface tension.

EXAMPLE

| Composition of the upper layer | Parts by weight |
| --- | --- |
| Co-doped iron powder (BET = 58 m$^2$/g, $_I$H$_c$ = 125 kA/m) | 60 |
| Vinyl chloride copolymer | 9 |
| Polycarbonatepolyurethane | 9 |
| Carboxylic acid-containing polyalkylene oxide acrylate | 4 |
| α-Al$_2$O$_3$ | 7 |
| Lubricant | 2 |
| Dispersant | 2 |
| Diisocyanate | 2 |
| Tetrahydrofuran | 250 |

The viscosity of the dispersion was 1,450 mPa.s.

| Composition of the lower layer | Parts by weight |
| --- | --- |
| Co-doped iron powder (BET = 58 m$^2$/g, $_I$H$_c$ = 125 kA/m) | 60 |
| Vinyl chloride copolymer | 9 |
| Polycarbonatepolyurethane | 9 |
| Carboxylic acid-containing polyalkylene oxide acrylate | 4 |
| Carbon black (BET = 265 m$^2$/g, mean particle size 18 nm) | 5 |
| Lubricant | 2 |
| Dispersant | 2 |
| Diisocyanate | 2 |
| Tetrahydrofuran | 250 |

The viscosity of the dispersion was 1,500 mPa.s.

The two layers were applied by coextrusion at an extrusion rate of 100 m/min to a 7 μm thick polyethylene terephthalate substrate. The thickness of the upper layer was 1.8 μm and that of the lower layer was 1.6 μm. Thereafter, the magnetic recording medium obtained was slit to a width of 8 mm and subjected to the conventional tests for an 8 mm video tape. A half inch mirror mastertape was also produced in a similar manner.

COMPARATIVE EXAMPLE 1

The procedure was as in the abovementioned Example, except that the lower layer and the upper layer were applied in two operations, the upper layer being cast on the dry lower layer.

COMPARATIVE EXAMPLE 2

The procedure was as in the Example, except that the lower layer was omitted.

The following results were obtained:

TABLE

| | Surface resistance (Ω / □) | Running behavior in the Mirrormaster recorder |
| --- | --- | --- |
| Example | $10^4$ | good |
| Comparative Example 1 | $10^5$ | inadequate |
| Comparative Example 2 | $10^{10}$ | inadequate |

We claim:
1. A magnetic recording medium comprising a non-magnetic substrate and a plurality of magnetizable layers on said substrate, said magnetizable layers being formed by a wet-on-wet method by means of a sheet extruder having an extruder orifice with upper and lower lips and having at least two slot dies for the wet-on-wet application of the plurality of magnetizable layers one on top of the other onto the substrate, the upper lip of the extruder orifice of the slot dies being recessed relative to the lower lip and a cuboid magnet whose upper edge is opposite the extruder orifice being arranged behind the substrate and parallel thereto, wherein at least one magnetizable layer not immediately adjacent to the substrate contains, as magnetizable pigments, predominantly metal powders or metal powder alloys which are dispersed in a polymeric binder and the magnetizable layer immediately adjacent to the substrate contains, as magnetizable pigments, predominantly metal powders or metal alloy powders which are dispersed in a polymeric binder and further additives which give the desired performance characteristics of the magnetic recording medium, including, as conductivity-increasing or transparency-reducing additives, carbon black in an amount of from 5 to 10% by weight, based on the magnetizable pigment, this carbon black being contained only in the magnetizable lever immediately adjacent to the substrate.

2. A magnetic recording medium as claimed in claim 1, wherein the two magnetizable layers have very similar rheological properties.

\* \* \* \* \*